US009232076B2

(12) United States Patent
Guedalia et al.

(10) Patent No.: US 9,232,076 B2
(45) Date of Patent: Jan. 5, 2016

(54) METHODS AND SYSTEMS OF PROVIDING STATUS MESSAGE CALLING

(75) Inventors: Jacob Guedalia, Newton, MA (US); Issac David Guedalia, Bet Shemesh (IL)

(73) Assignee: QUALCOMM INCORPORATED, San Diego, CA (US)

(*) Notice: Subject to any disclaimer, the term of this patent is extended or adjusted under 35 U.S.C. 154(b) by 900 days.

(21) Appl. No.: 11/948,404

(22) Filed: Nov. 30, 2007

(65) Prior Publication Data

US 2008/0167019 A1 Jul. 10, 2008

Related U.S. Application Data

(60) Provisional application No. 60/883,841, filed on Jan. 8, 2007, provisional application No. 60/884,045, filed on Jan. 9, 2007, provisional application No. 60/889,305, filed on Feb. 12, 2007, provisional (Continued)

(51) Int. Cl.
*H04M 3/42* (2006.01)
*H04W 24/00* (2009.01)
*H04M 15/00* (2006.01)
*H04W 8/26* (2009.01)
*H04W 48/08* (2009.01)

(52) U.S. Cl.
CPC ............... *H04M 15/00* (2013.01); *H04W 8/26* (2013.01); *H04W 48/08* (2013.01)

(58) Field of Classification Search
USPC .......................................... 709/204, 206, 224
See application file for complete search history.

(56) References Cited

U.S. PATENT DOCUMENTS

| | | | |
|---|---|---|---|
| 4,751,728 A | 6/1988 | Treat | |
| 4,799,253 A | 1/1989 | Stern et al. | |
| 5,570,417 A | 10/1996 | Byers | |
| 5,577,100 A | 11/1996 | McGregor et al. | |
| 5,635,940 A | 6/1997 | Hickman et al. | |
| 5,848,128 A | 12/1998 | Frey | |

(Continued)

FOREIGN PATENT DOCUMENTS

| | | |
|---|---|---|
| DE | 10341737 A1 | 4/2005 |
| EP | 1179941 A | 2/2002 |

(Continued)

OTHER PUBLICATIONS

Sinnreich/Pulver Com H. et al.: "*SIP Telephony Device Requirements and Configuration*; draft-sinnreich-sipdev-req-08.txt", IETF Standard-Working-Draft, Internet Engineering Task Force, IETF, CH, No. 8, Oct. 1, 2005, XP015043067 ISSN: 0000-0004.

(Continued)

*Primary Examiner* — William Nealon
(74) *Attorney, Agent, or Firm* — Muncy, Geissler, Olds & Lowe, P.C.

(57) ABSTRACT

In an embodiment, a method of providing a status message may include receiving, from a mobile device one or more status messages, wherein each status message corresponds to one or more contacts in an address book, storing the status messages and corresponding one or more contacts, transmitting one of the status messages to a mobile device associated with one of the one or more contacts, wherein the status message is displayed on the associated mobile device and integrating the status message into an address book associated with the contact.

15 Claims, 9 Drawing Sheets

Related U.S. Application Data application No. 60/889,959, filed on Feb. 15, 2007, provisional application No. 60/896,003, filed on Mar. 21, 2007, provisional application No. 60/908,726, filed on Mar. 29, 2007, provisional application No. 60/940,758, filed on May 30, 2007, provisional application No. 60/942,557, filed on Jun. 7, 2007, provisional application No. 60/945,931, filed on Jun. 24, 2007, provisional application No. 60/947,963, filed on Jul. 4, 2007.

(56) References Cited

U.S. PATENT DOCUMENTS

| | | |
|---|---|---|
| 5,878,122 A | 3/1999 | White et al. |
| 5,913,162 A | 6/1999 | Gourdin et al. |
| 5,946,618 A | 8/1999 | Agre et al. |
| 6,044,263 A | 3/2000 | Valentine et al. |
| 6,188,762 B1 | 2/2001 | Shooster |
| 6,205,126 B1 | 3/2001 | Moon |
| 6,333,931 B1 | 12/2001 | LaPier et al. |
| 6,564,261 B1 | 5/2003 | Gudjonsson et al. |
| 6,618,590 B1 | 9/2003 | Howe |
| 6,678,364 B2 | 1/2004 | Ruckart |
| 6,687,362 B1 | 2/2004 | Lindquist et al. |
| 6,697,858 B1 | 2/2004 | Ezerzer et al. |
| 6,707,811 B2 | 3/2004 | Greenberg et al. |
| 6,751,457 B1 | 6/2004 | Martin |
| 6,775,375 B1 | 8/2004 | Bhusri |
| 6,850,762 B1 | 2/2005 | Ala-Luukko et al. |
| 6,917,610 B1 | 7/2005 | Kung et al. |
| 6,937,873 B2 | 8/2005 | Levy et al. |
| 7,039,164 B1 | 5/2006 | Howe |
| 7,085,260 B2 | 8/2006 | Karaul et al. |
| 7,099,652 B2 | 8/2006 | Brown et al. |
| 7,110,772 B1 | 9/2006 | Wu |
| 7,127,488 B1 | 10/2006 | Scott et al. |
| 7,130,620 B2 | 10/2006 | Forman et al. |
| 7,139,370 B1 | 11/2006 | Tse |
| 7,243,075 B1 | 7/2007 | Shaffer et al. |
| 7,257,837 B2 | 8/2007 | Xu et al. |
| 7,274,786 B2 | 9/2007 | Fleischer, III et al. |
| 7,280,652 B2 * | 10/2007 | Bocking et al. .......... 379/355.02 |
| 7,369,650 B1 | 5/2008 | Bhusri |
| 7,395,057 B2 | 7/2008 | Awasthi et al. |
| 7,436,820 B2 | 10/2008 | Beck et al. |
| 7,471,692 B1 | 12/2008 | Erickson |
| 7,480,723 B2 | 1/2009 | Grabelsky et al. |
| 7,529,231 B2 | 5/2009 | Soo et al. |
| 7,548,611 B2 | 6/2009 | Howe |
| 7,620,404 B2 | 11/2009 | Chesnais et al. |
| 7,634,509 B2 * | 12/2009 | Onyon et al. .......................... 1/1 |
| 7,701,883 B2 | 4/2010 | Beckemeyer |
| 7,738,861 B2 | 6/2010 | Fournier |
| 7,974,610 B2 | 7/2011 | Nachum |
| 8,116,836 B2 | 2/2012 | Ki |
| 8,391,848 B2 | 3/2013 | Guedalia et al. |
| 2001/0038624 A1 | 11/2001 | Greenberg et al. |
| 2002/0013163 A1 | 1/2002 | O'Prey |
| 2002/0099670 A1 | 7/2002 | Jakobsson |
| 2002/0120760 A1 | 8/2002 | Kimchi et al. |
| 2002/0129103 A1 | 9/2002 | Birkler et al. |
| 2002/0169984 A1 | 11/2002 | Kumar et al. |
| 2002/0193107 A1 | 12/2002 | Nascimento |
| 2003/0013441 A1 | 1/2003 | Bhogal et al. |
| 2003/0046404 A1 | 3/2003 | O'neill et al. |
| 2003/0046405 A1 | 3/2003 | O'neill et al. |
| 2003/0050051 A1 | 3/2003 | Vilander |
| 2003/0060211 A1 | 3/2003 | Chern et al. |
| 2003/0091024 A1 | 5/2003 | Stumer |
| 2003/0115138 A1 | 6/2003 | Brown et al. |
| 2003/0118175 A1 | 6/2003 | Hariri et al. |
| 2003/0148790 A1 * | 8/2003 | Pappalardo et al. ........... 455/558 |
| 2003/0190025 A1 | 10/2003 | Okamura et al. |
| 2004/0019539 A1 | 1/2004 | Raman et al. |
| 2004/0037396 A1 | 2/2004 | Gray et al. |
| 2004/0044771 A1 | 3/2004 | Allred et al. |
| 2004/0143669 A1 | 7/2004 | Zhao et al. |
| 2004/0156394 A1 | 8/2004 | Westman |
| 2004/0165714 A1 | 8/2004 | Pinault |
| 2004/0202117 A1 | 10/2004 | Wilson et al. |
| 2004/0203643 A1 | 10/2004 | Bhogal et al. |
| 2004/0213209 A1 | 10/2004 | O'Connor et al. |
| 2004/0229644 A1 | 11/2004 | Heie et al. |
| 2004/0235509 A1 | 11/2004 | Burritt et al. |
| 2005/0025043 A1 | 2/2005 | Mussman et al. |
| 2005/0027867 A1 | 2/2005 | Mueller |
| 2005/0033852 A1 | 2/2005 | Tenhunen |
| 2005/0036597 A1 | 2/2005 | Kobrosly et al. |
| 2005/0059418 A1 | 3/2005 | Northcutt |
| 2005/0070230 A1 | 3/2005 | Das et al. |
| 2005/0102257 A1 * | 5/2005 | Onyon et al. ........................ 707/1 |
| 2005/0138571 A1 | 6/2005 | Keskar et al. |
| 2005/0157858 A1 * | 7/2005 | Rajagopalan et al. ..... 379/93.23 |
| 2005/0163065 A1 | 7/2005 | Yule |
| 2005/0171799 A1 | 8/2005 | Hull et al. |
| 2005/0182798 A1 * | 8/2005 | Todd et al. .................... 707/200 |
| 2005/0198031 A1 | 9/2005 | Pezaris et al. |
| 2005/0198172 A1 | 9/2005 | Appelman et al. |
| 2005/0198365 A1 | 9/2005 | Wei |
| 2005/0221847 A1 | 10/2005 | Brehler et al. |
| 2005/0249344 A1 | 11/2005 | Mueller et al. |
| 2005/0273512 A1 | 12/2005 | Cho |
| 2006/0018306 A1 | 1/2006 | Nishida et al. |
| 2006/0018311 A1 | 1/2006 | Kobayashi et al. |
| 2006/0023701 A1 | 2/2006 | Nishida et al. |
| 2006/0026288 A1 | 2/2006 | Acharya et al. |
| 2006/0029042 A1 | 2/2006 | Nishida et al. |
| 2006/0029043 A1 | 2/2006 | Nishida et al. |
| 2006/0029046 A1 | 2/2006 | Nishida et al. |
| 2006/0031368 A1 | 2/2006 | DeCone |
| 2006/0040711 A1 | 2/2006 | Whistler et al. |
| 2006/0077932 A1 | 4/2006 | Takeda et al. |
| 2006/0159456 A1 | 7/2006 | Gumaste et al. |
| 2006/0168326 A1 | 7/2006 | Baldwin et al. |
| 2006/0173961 A1 | 8/2006 | Turski et al. |
| 2006/0205400 A1 | 9/2006 | Kiyomoto |
| 2006/0209690 A1 | 9/2006 | Brooke et al. |
| 2006/0236388 A1 | 10/2006 | Ying et al. |
| 2006/0246877 A1 | 11/2006 | Kashanian et al. |
| 2006/0248146 A1 * | 11/2006 | Wilk ............................ 709/206 |
| 2006/0270392 A1 | 11/2006 | Scott et al. |
| 2006/0270400 A1 | 11/2006 | DaSilva et al. |
| 2007/0005776 A1 | 1/2007 | Hansen et al. |
| 2007/0016682 A1 | 1/2007 | Hodgson |
| 2007/0060100 A1 | 3/2007 | Watler et al. |
| 2007/0064607 A1 | 3/2007 | Moon et al. |
| 2007/0071006 A1 | 3/2007 | Bosch et al. |
| 2007/0112964 A1 | 5/2007 | Guedalia et al. |
| 2007/0143397 A1 | 6/2007 | Guedalia et al. |
| 2007/0162350 A1 | 7/2007 | Friedman |
| 2007/0281676 A1 | 12/2007 | Borras et al. |
| 2007/0287430 A1 | 12/2007 | Hosain et al. |
| 2008/0003964 A1 | 1/2008 | Alperin et al. |
| 2008/0013531 A1 | 1/2008 | Elliott et al. |
| 2008/0037524 A1 | 2/2008 | Koch et al. |
| 2008/0056208 A1 | 3/2008 | Hinrikus et al. |
| 2008/0056235 A1 | 3/2008 | Albina et al. |
| 2008/0070579 A1 | 3/2008 | Kankar et al. |
| 2008/0076409 A1 * | 3/2008 | Hinrikus et al. .............. 455/425 |
| 2008/0096592 A1 | 4/2008 | Waytena et al. |
| 2008/0139210 A1 | 6/2008 | Gisby et al. |
| 2008/0159261 A1 | 7/2008 | Bessis |
| 2008/0159515 A1 | 7/2008 | Rines |
| 2008/0166999 A1 | 7/2008 | Guedalia et al. |
| 2008/0167020 A1 | 7/2008 | Guedalia et al. |
| 2008/0167039 A1 | 7/2008 | Guedalia et al. |
| 2008/0181165 A1 | 7/2008 | Guedalia et al. |
| 2008/0188227 A1 | 8/2008 | Guedalia et al. |
| 2008/0192910 A1 | 8/2008 | Guedalia et al. |
| 2008/0244023 A1 | 10/2008 | Guedalia et al. |
| 2008/0248795 A1 | 10/2008 | Petersen et al. |
| 2008/0263170 A1 | 10/2008 | Caron et al. |
| 2008/0305782 A1 | 12/2008 | Guedalia et al. |

(56) References Cited

U.S. PATENT DOCUMENTS

| | | |
|---|---|---|
| 2009/0190738 A1 | 7/2009 | Guedalia et al. |
| 2010/0080376 A1 | 4/2010 | Hartley et al. |
| 2011/0312308 A1 | 12/2011 | Willey |
| 2013/0137421 A1 | 5/2013 | Guedalia et al. |

FOREIGN PATENT DOCUMENTS

| | | |
|---|---|---|
| EP | 1517256 A2 | 3/2005 |
| EP | 1701569 A | 9/2006 |
| GB | 2391135 A | 1/2004 |
| WO | 9723083 | 6/1997 |
| WO | WO 98/47298 A3 | 10/1998 |
| WO | WO 9934628 A | 7/1999 |
| WO | 0198867 A2 | 12/2001 |
| WO | 0215030 A1 | 2/2002 |
| WO | 0221779 A1 | 3/2002 |
| WO | 0239237 A | 5/2002 |
| WO | WO 03032613 A | 4/2003 |
| WO | 03094011 A1 | 11/2003 |
| WO | 2005065296 A | 7/2005 |
| WO | 2006039552 A2 | 4/2006 |
| WO | WO 2006/044654 A | 4/2006 |
| WO | 2007001850 A1 | 1/2007 |
| WO | 2007005124 A2 | 1/2007 |
| WO | 2007025373 A | 3/2007 |
| WO | 2007109559 A2 | 9/2007 |
| WO | 2008013642 A2 | 1/2008 |

OTHER PUBLICATIONS

Rosenberg, J. et al.: "*SIP: Session Initiation Protocol*" 20020601; 20020600; Jun. 1, 2002, pp. 1-269, XP015009039.

Schulzrinne Columbia University B. Volz Ericsson H: "*Dynamic Host Configuration Protocol (DHCPv6) Options for Session Initiation Protocol (SIP) Servers; rfc3319.txt*", IETF Standard, Internet Engineering Task Force, IETF, CH. Jul. 1, 2003, XP015009189; ISSN: 0000-0003.

Saravanan Shanmugham, et al., Daniel C. Burnett, "Media Resource Control Protocol Version 2(MRCPv2)", IETF Standard-Working-Draft, Internet Engineering Task Force, IETF, vol. Speechsc, No. 6, pp. 1-176 (2005).

Sinnreich, et al., "SIP telephony device requirements and configuration draft-sinnreich-sipdev-req-07.txt", IETF Standard-Working-Draft, Internet Engineering Task Force, No. 7, pp. 1-37 (2005).

Griffin et al., "Integrating SIP, presence and FTP to provide wireless multimedia messaging", Wireless Communications and Networking Conference, IEEE Communications Society, 4:2581-2586 (2004).

Handley et al., "RFC 2543 SIP: Session Initiation Protocol", IETF Standard, Internet Engineering Task Force, pp. 1-153 (1999).

Handley et al., "SIP: Session Initiation Protocol", IETF, Standard-Working-Draft, Internet Engineering Task Force, vol. 4, pp. 1-83 (1997).

Petrie, Pingtel Corp., A Framework for SIP User Agent Profile Delivery draft-iet f-sipping-config-framework-02.txt., IETF Standard-Working-Draft, Internet Engineering Task Force, No. 2, pp. 1-22 (2004).

Colman Ho, "Voice Over Internet Protocol (VoIP) Overview", Presentation to TSACC, Mar. 23, 2004; www.isacc.ca/isacd_doc/Book%2017%20-%202004/TSACC-04-31305.ppt.

Alcatel-Lucent, "Alcatel-Lucent OmniPCX Enterprise Communication Server: Delivering powerful, reliable and scalable IP communications to drive your 21st century business", 2007. http://www1.alcatel-lucent.com/com/en/appcontent/opgss/ENT_OmniPCX%20Enterprise_datasheet_1007_EN_tcm228-1353221635.pdf.

SIP Connect, "CableLabs Proposal for SIP Connect 1.1", 2007; http://www.sipforum.org/component/option,com_docman/task,doc_view/gid,149/Itemid,75/.

NST, New Standard Telephony, Convergence Simplified, Company Profile, NST 2005; http://www.ns-tel.com/files/NST_Company_Profile.pdf.

Janne Lundqvist et al., Messaging-over-IP—A network for messaging and information services; http://www.ericsson.com/ericsson/corpinfo/publications/review/1999_03/fi les/1999035. pdf.

Case Study, Intel Centrino, Mobile Technology, Intel Xeon Processor MP, Shanghai GM, "Seamless Communications", http://www.intel.com/netcomms/technologies/voice/310998.pdf.

Kundan Narendra Singh, Thesis, "Reliable, Sealable and Interoperable Internet Telephony", Columbia University, 2006; http://www1.cs.columbia.edu/~kns10/publication/thesis.pdf.

Intel Communications Alliance, "TeleSym and Intel Deliver Voice-over-Internet-Protocol (VoIP) Enterprise Communication Solution", Jun. 2004; http://www.intel.com/network/csp/pdf/9003wp.pdf.

* cited by examiner

METHODS AND SYSTEMS OF PROVIDING STATUS MESSAGE CALLING

CLAIM OF PRIORITY

This application claims priority under 35 U.S.C. §119(c) to U.S. Provisional Application No. 60/883,841, filed Jan. 8, 2007, U.S. Provisional Application No. 60/884,045 filed Jan. 9, 2007, U.S. Provisional Application No. 60/889,305, filed Feb. 12, 2007, U.S. Provisional Application No. 60/889,959, filed Feb. 15, 2007, U.S. Provisional Application No. 60/896, 003, filed Mar. 21, 2007, U.S. Provisional Application No. 60/908,726, filed Mar. 29, 2007, U.S. Provisional Application No. 60/940,758, filed May 30, 2007, U.S. Provisional Application No. 60/942,557, filed Jun. 7, 2007, U.S. Provisional Application No. 60/945,931, filed Jun. 24, 2007, and U.S. Provisional Application No. 60/947,963, filed Jul. 4, 2007, the entireties of which are incorporated by reference herein.

BACKGROUND

As the mobile telecommunication industry grows, mobile subscribers are becoming increasingly more aware of their leverage in the market. They carefully compare service providers and call plans, and make educated choices before subscribing to a carrier and a service. Subscribers also continuously seek new and improved features to integrate into their mobile service such as enhanced chat, long distance service options, customized graphical user interfaces and the like.

Despite being informed consumers, mobile subscribers are often disadvantaged in the mobile market. For example, although a subscriber may be knowledgeable about their own calling plan subscription, subscribers are usually unaware of the cost per minute of a call to the calling destination. This puts a mobile subscriber at a disadvantage in making educated and economical calling choices.

Mobile subscribers would also welcome more long distance service options. A subscriber to a telecommunication carrier service typically needs a local access number to utilize the service. This usually involves selecting a number from a list of regional or area numbers, such as a preprinted list on a calling card, to find the access number closest to the subscriber's current location. The subscriber dials the local access number and is usually connected to a long distance service provider via a telephony network. Typically, the subscriber can then enter a target long distance telephone number, and the long distance service provider will route the call to a subscriber-specified number. The current approach has many disadvantages, however, such as having to purchase a phone care and locating a local access number. In addition, a subscriber who accidentally places a call using a non-local access number may incur long distance charges.

It is common for a subscriber to experience a significant delay after powering on his mobile device before he is able to access updated contact information in his address book. This is because the mobile device must contact and retrieve an updated contact list from a server. As such subscribers may desire to access his address book while the contact information is being updated.

To keep pace with the constant evolution of mobile telephony, mobile subscribers are treated to a variety of applications designed to optimize their mobile communication experience. For example, subscribers can access the Internet with the mobile device, send chat messages to their contacts and the like. Subscribers can glean relevant and up-to-date information about their contacts in their address books by viewing presence-statuses, away messages, sometimes referred to as status messages, mood messages or the like. However, it is common for a subscriber's status message to read the same regardless of which contact views it. As such a subscriber cannot customize his status message based on the contact who is viewing it.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

In an embodiment, a method of providing a status message may include receiving, from a mobile device, one or more status messages, wherein each status message corresponds to one or more contacts in an address book, storing the status messages and corresponding one or more contacts, transmitting one of the status messages to a mobile device associated with one of the one or more contacts, wherein the status message is displayed on the associated mobile device and integrating the status message into an address book associated with the contact.

In an embodiment, a method of providing contact information on a mobile device may include generating a list of a predefined number of most-recently called contacts from an address book on a subscriber's mobile device and for each most-recently called contact, receiving contact information, comprising one or more of a contact name, a telephone number, a mood message, a holographic message, and a status message. The method may also include transmitting the list, associated contact information and one or more instructions to the subscriber's mobile device, wherein the one or more instructions instruct the mobile device to display the list and associated contact information.

In an embodiment, a system of providing a status message may include a subscriber mobile device comprising an address book having one or more contacts, a processor for processing data relating to one or more status messages, wherein the processor is in communication with the subscriber mobile device and one or more contact mobile devices associated with one or more contacts in the address book, wherein each contact mobile device is in communication with the processor.

DETAILED DESCRIPTION

Figure 1:
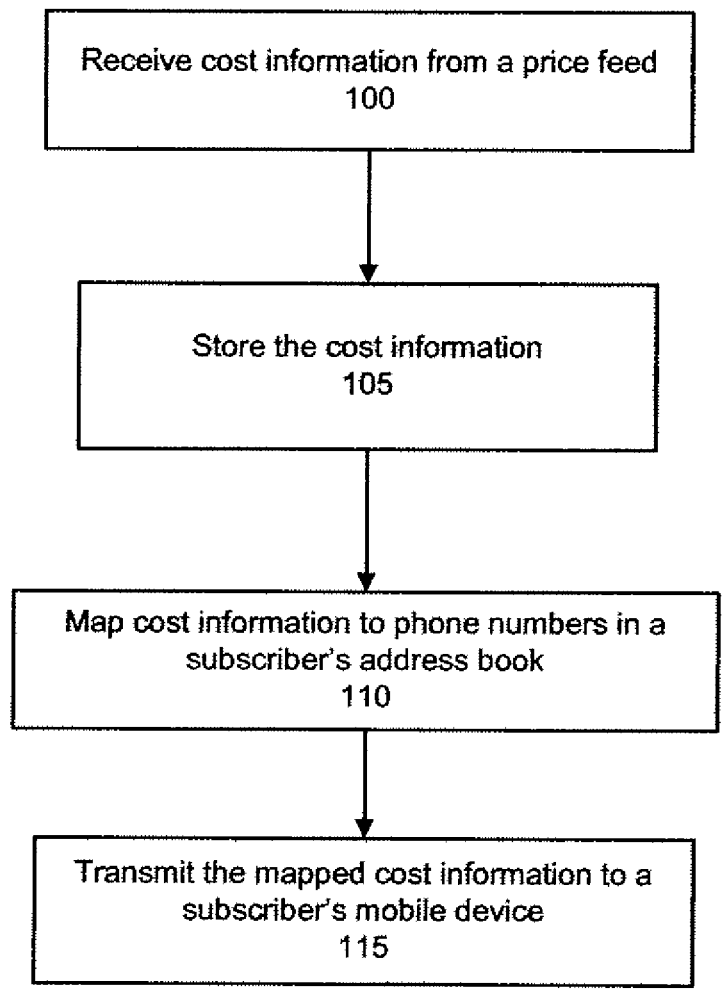
FIG. 1 depicts a flow chart for implementing an exemplary call-cost feature on a mobile device.

FIG. 1 illustrates a flow chart for implementing an exemplary call-cost feature on a mobile device. A mobile device may include mobile or portable devices such as cellular phones, PDAs, media players or the like. A mobile device may have a processor and a processor-readable storage medium in communication with the processor.

As illustrated by FIG. 1, a price table database may receive 100 cost information from a price feed. A price feed provides real time pricing information for a product or service. For example, stock prices may be available to an online trader via a price feed.

In an embodiment, the price table database may be housed on a computing device, such as a server, and the cost information may include the cost per minute for a plurality of calling destinations or the like. Table 1 illustrates an exemplary price table database according to an embodiment.

TABLE 1

| Calling Destination | Cost per minute |
|---|---|
| Canada | $0.33/minute |
| France | $0.56/minute |
| Israel | $0.35/minute |
| United States | $0.15/minute |

The price table database may receive 100 cost information from the price feed on a regular basis. In an embodiment, the price feed may include a rate sheet provided by a telephone service provider.

In an embodiment, at least a portion of the received cost information may be stored 105 is the price table database. For example, the price table database may receive a cost-per-minute for calling Canada. If the price table database does not currently include a cost-per-minute for Canada, the cost information may be added to the price table database. If the price table database includes a different cost-per-minute for Canada, the stored cost information may be replaced with the cost information from the price feed. In an embodiment, if the received cost information associated with a calling destination is less than the stored cost information associated with the calling destination, an alert may be generated. The alert may be used to notify a subscriber of the price discount associated with the particular calling destination. In an embodiment, the server may transmit the alert to a subscriber's mobile device to notify the subscriber of the price discount.

A mapper may use the cost information contained in the price table database to map 110 cost information to one or more phone numbers in a subscriber's address book. In an embodiment, the mapper may utilize pre-defined rules to map 110 cost information to a contact number. A contact is an entry in an address book that is accessible by a mobile device. A contact number is a mobile device number associated with a contact. In an embodiment, the mapper may map 110 cost information to one or more contact numbers using pre-defined rules. The pre-defined rules may be used to determine, for example, a calling destination, whether the phone number belongs to a landline or a mobile device, or the like. For example, in Israel, landlines are provisioned with the country code +972 followed by an area code ranging from '1' to '9', with the exception of '5.' Mobile phone numbers typically begin with '5.' If a subscriber has the phone number "972-2-5388-0234" in his address book, the mapper may use one or more pre-defined rules to determine the contact number is a landline number is Israel. The mapper may use this information to map the corresponding cost per minute to one or more contact numbers in a subscriber's address book.

Figure 2:
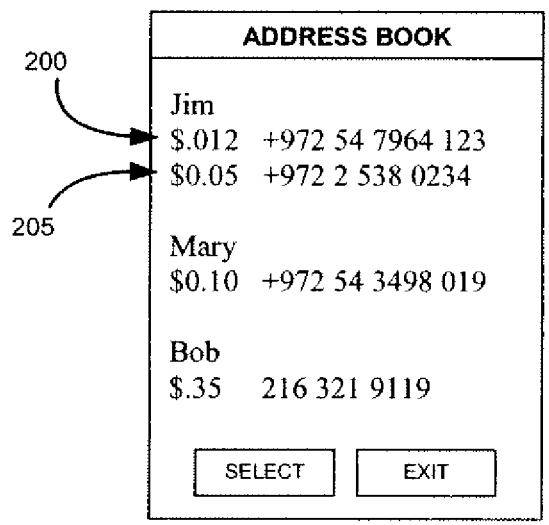
FIG. 2 depicts a mobile device display of exemplary cost information according to an embodiment.

In an embodiment, the mapped cost information may be transmitted to the subscriber's mobile device for display to the subscriber. FIG. 2 depicts a mobile phone display of exemplary cost information according to an embodiment. As illustrated, the cost to call one or more contacts in a subscriber's address book may be displayed. For example, calling Jim on his mobile phone costs $0.0136/minute 200, whereas calling Jim on his landline phone costs $0.017/minute 205. The subscriber may use this information to make an informed calling decision regarding which number to call.

Figure 3:
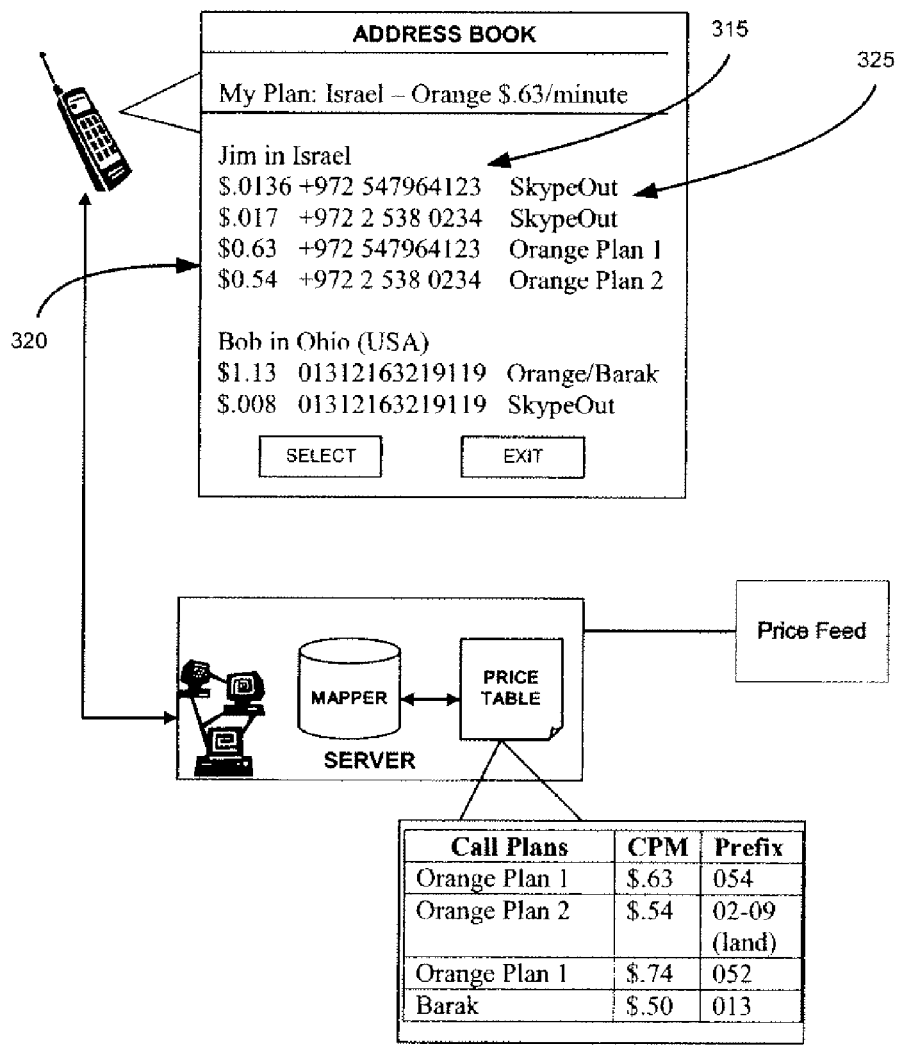
FIG. 3 depicts an exemplary system of providing cost information according to an embodiment.

In an embodiment, cost information may be provided based on associated calling plans. As illustrated by FIG. 3, the price table database may include cost information such as mobile providers' calling plans 300, a cost-per-minute value 305 associated with the calling plans, a dialing prefix 310 provisioned for each calling plan and/or the like. In an embodiment, the price table database may receive this cost information from the price feed on a regularly updated basis.

In an embodiment, the mapper may map a contact's number with the subscriber's calling plan and the corresponding cost information may be displayed to a subscriber. One or more contacts in a subscriber's address book may be displayed with cost information based on the subscriber's and/or the contact's calling plan. For example, FIG. 3 illustrates exemplary information that may be displayed on a mobile device. A contact's number 315 may be listed with a cost-per-minute value 320 and a calling plan 325 associated with the number 315.

In an embodiment, the mapper may use a contact's phone number to determine calling destination information such as a contact's locale, whether the contact's number corresponds to a landline or a mobile phone or the like. After calling destination information is determined, the mapper may map at least a portion of the calling destination information to the subscriber's calling plan. For example, a subscriber may want to call a contact who has two numbers. The first number may be a landline in Israel while the second number may be a mobile phone in Israel. The mapper may match the subscriber's calling plan with the destination information to determine that cost information associated with calling the two numbers.

In an embodiment, multiple service providers may be used to place a call. In such an embodiment, the mapper may map cost information associated with all necessary providers so that a combined price may be displayed to a subscriber. For example, if a subscriber calls an overseas contact using a long-distance service provider, the cost-per-minute may reflect both the long distance provider's charges as well as the local mobile carrier's airtime charges.

Figure 4:
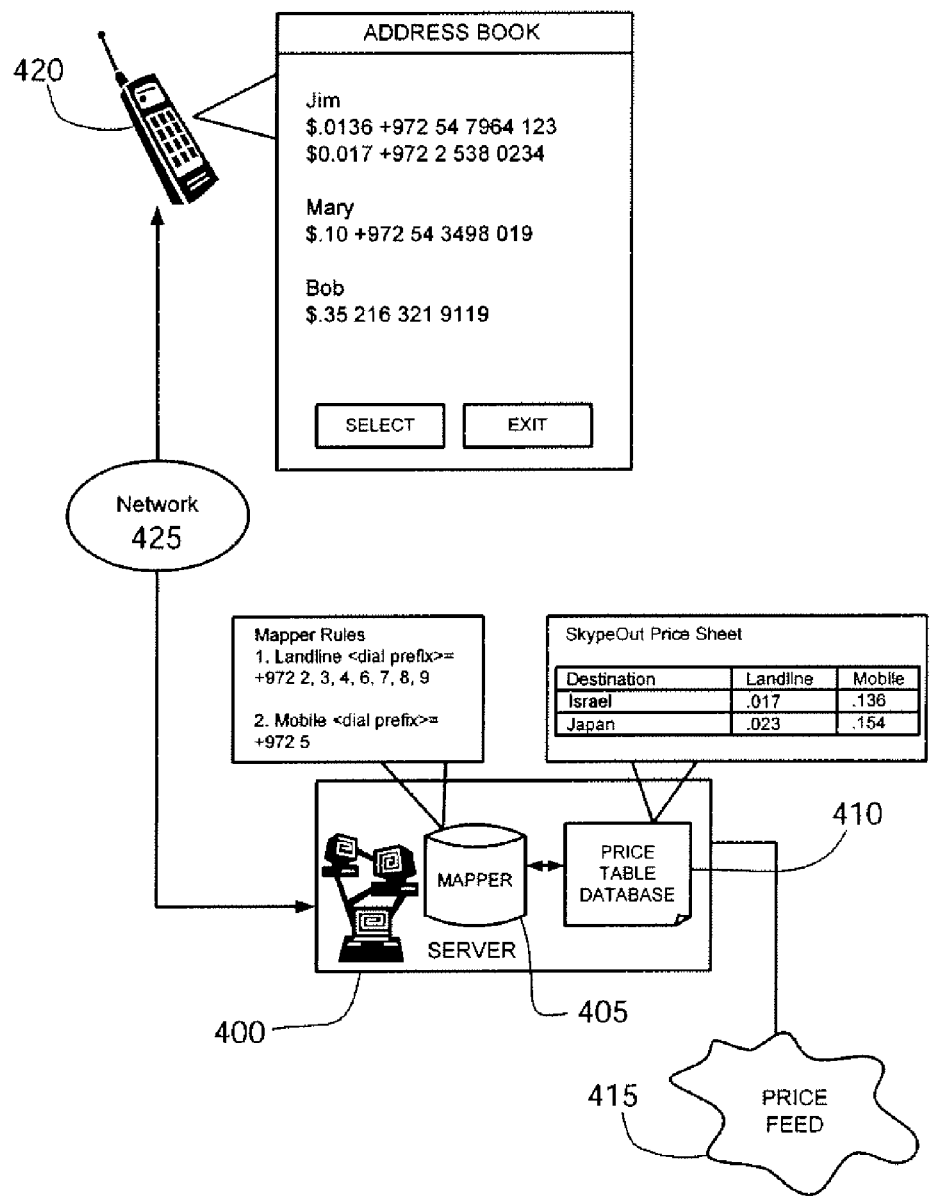
FIG. 4 depicts an exemplary system of providing cost information according to an embodiment.

FIG. 4 depicts an environment suitable for practicing the illustrative embodiments. A processor, such as a server 400 may include a mapper 405 and/or a price table database 410. The server 400 may be in communication with a price feed 415 and one or more mobile devices 420 via a network 425. The server 400 may be implemented on a stand-alone computer system or may be implemented by distributed components such as separate electronic devices.

Figure 5:
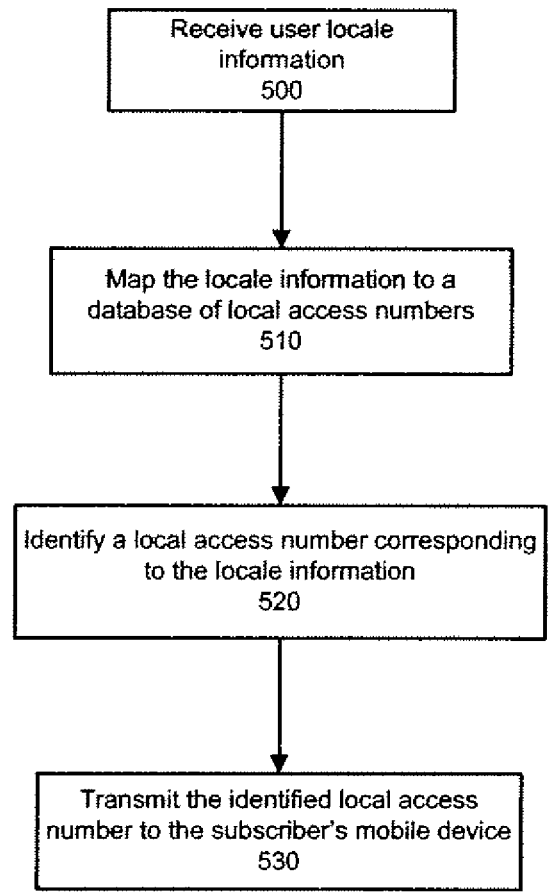
FIG. 5 illustrates flow chart for assigning an exemplary local access number according to an embodiment.

In an embodiment, a subscriber may use a local access number to place a long distance call. A local access number is a local telephone number a subscriber may employ to connect to a certain long distance service provider. FIG. 5 illustrates an exemplary flow chart of a method for assigning a local access number according to an embodiment. A subscriber's locale information may be received 500 by a server. In an embodiment, a subscriber may use a mobile device to subscribe to a telecommunication service via a data line. For example, a subscriber may access a browser to transmit an HTTP request. Upon registration, a subscriber may provide locale information such as an area code and a telephone number, a zip code or the like corresponding to the subscriber's current location. The locale information may be communicated to a server.

In another embodiment, locale information may be automatically received 500 by a server. For example, the locale information may be transmitted via an HTTP browser to a server where it may be processed by a service delivery framework (SDF). The SDF may be aware of the subscriber locale information, such as a Mobile Systems International Subscriber Identity Number (MSISDN), and may insert such information into an HTTP header. The header may be transmitted to the server where the mapper may extract the locale information.

In an embodiment, the mapper may map 510 the locale information to a database of available access numbers. A local access number may be identified 520 based on the subscriber's current location and the identified local access number may be transmitted 530 to the subscriber's mobile device.

In an embodiment, the mapper may generate a list of long distance service providers having local access numbers corresponding to the subscriber's locale. The server may transmit the list via a data line to the subscriber's mobile device. The subscriber may select a long distance service provider, and may receive the corresponding local access number on his mobile device.

In an embodiment, the subscriber may use the local access number to connect to a chosen long distance service provider. The subscriber may manually input the local access number, followed by the desired long-distance phone number. Alternatively, the subscriber may employ an application such as an address book, to automate this process. For example, a mobile device's address book may include a long-distance automatic dialing feature that allows for quick-dialing of a previously entered local access code.

In an embodiment, an existing address book may be populated with the local access number for future retrieval. In an embodiment, as a subscriber travels, his mobile device may receive and store new local access numbers based on his current location.

Figure 6:
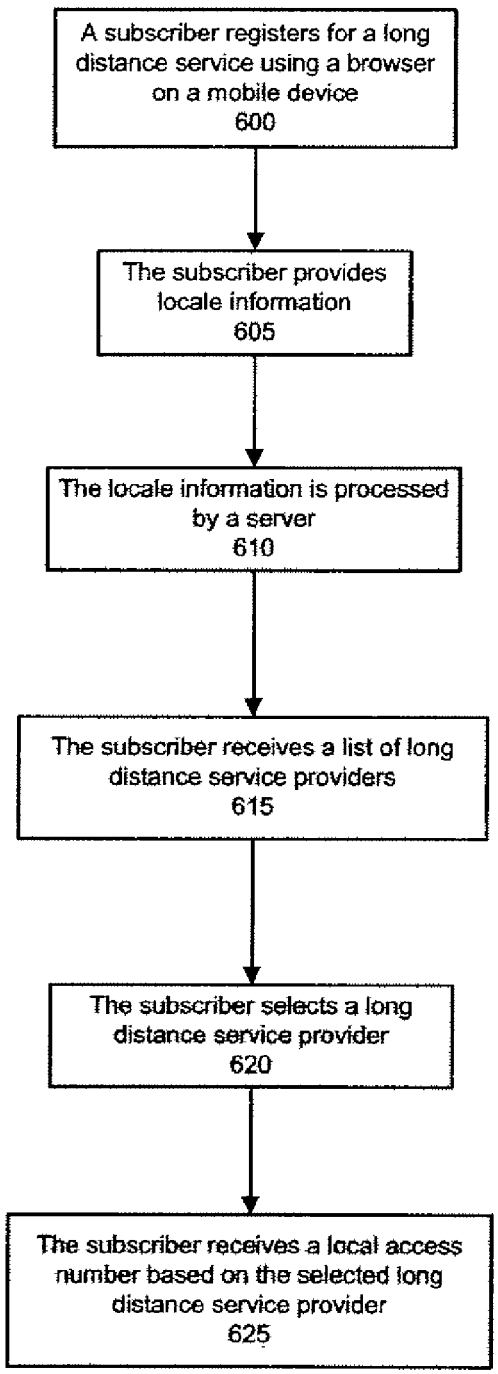
FIG. 6 illustrates a method of placing an exemplary long distance call using a local access number according to an embodiment.

FIG. 6 illustrates a method of placing a long distance call using a local access number according to an embodiment. For example, subscriber who wants to make a third-party long distance call may register 600 for a long distance service using a browser on his mobile device. Upon registration, the subscriber may be asked to provide 605 locale information, such as a local telephone number with an area code. The locale information may be processed 610 by the server, and the subscriber may receive 615 a list of one or more long distance service providers. The subscriber may select 620 a long distance service provider and may receive 625 a local access number based on the selected long distance provider on his mobile device. The subscriber may employ the local access number for as long as he remains in his current location. If the subscriber's address book is equipped with a long distance auto-dial feature, it may be automatically populated with the local access number when the server transmits it to the mobile device. If the subscriber changes locations, he may access his account on the subscription site, enter a new telephone number and area code, and receive a new local access number. The subscriber's old access number may be stored for later use.

In an embodiment, a local access number may be automatically dialed for the subscriber, and may or may not require subscriber confirmation. As such, the subscriber may only need to specify the preferred long distance number to call. For example, a subscriber may select or input the preferred long distance number to call, and an application on the mobile device may place the call by automatically dialing the access code local to the subscriber's local information. As described above, the locale information may be ascertained based on the telephone number provided by the subscriber at sign-up or by extracting the subscriber locale information from an HTTP header.

For example, a mobile user who wants to place a long distance call may select a contact from his address book to call. The subscriber's long distance subscription service may ascertain the subscriber's location by extracting locale information from an HTTP header transmitted by the subscriber's phone or by the locale information the subscriber provided at sign-up. The server may map the subscriber's location to an appropriate local access number which may be sent to the subscriber's mobile device. The subscriber may make one or more selections to dial the received local access number. Alternatively, the service may auto-dial the local access number and connect the call without the subscriber being aware that a local access number has been dialed.

Figure 7:
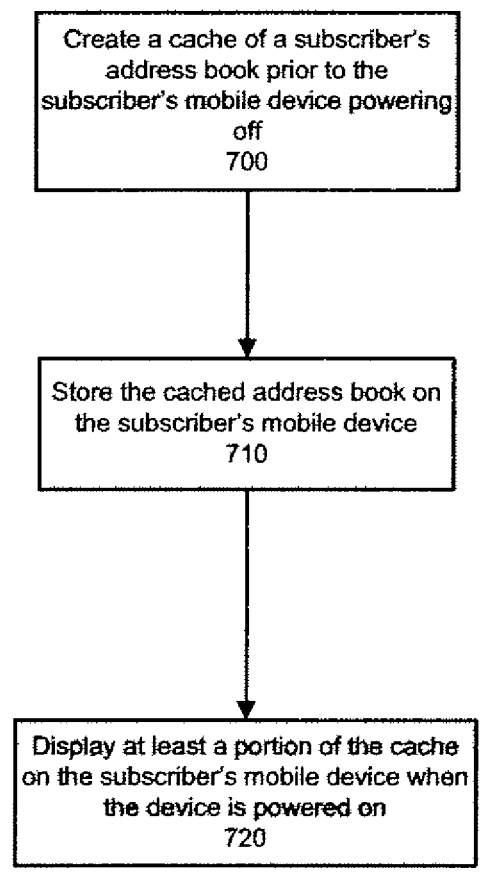
FIG. 7 illustrates a flow chart for an exemplary method of accessing contact information on a subscriber's mobile device according to an embodiment.

FIG. 7 illustrates a flow chart for an exemplary method of accessing contact information on a subscriber's mobile device according to an embodiment. When a subscriber first accesses a server-based mobile address book application, the subscriber may experience a significant delay while the address book attempts to retrieve the subscriber's address book from the server. In an embodiment, a cache of the address book may be created 700 before the subscriber's mobile device is powered off. The cache may include contact information stored in the subscriber's address book during the last application session. For example, the cache may include a contact's name, one or more telephone numbers associated with the contact, a status message associated with the contact and/or the like.

In an embodiment, a status message indicates whether the contact is online, offline or the like. A status message includes information relating to a status or state of a subscriber, and can be presented automatically to anyone who attempts to contact the subscriber. The status message may provide further information regarding the subscriber. In an embodiment, exemplary status messages may include "Having a bad day," "In a meeting," "At the gym" or the like.

In an embodiment, the cache may be stored 710 on the subscriber's mobile device. When a subscriber powers on his mobile device, at least a portion of the cache may be displayed 720 to a subscriber until a fresh upload of contact information can be obtained from the server. For example, when a subscriber accesses an address book application after powering on his mobile device, the subscriber may be presented with a cached version of his address book that may include contacts' names, telephone numbers, status message and/or the like which were stored in the cache prior to the mobile device being powered off.

In an embodiment, because the server may take a significant amount of time to upload a complete fresh address book, contacts may be updated in a particular order according to an embodiment. For example, the first several contacts that appear in a subscriber's mobile device display may have their information updated first. Alternatively, priority may be given to one or more pre-determined contacts.

A problem may arise when a subscriber attempts to call a contact's telephone number using a cached address book. In an embodiment, the cached information may include a contact identification number associated with a contact and/or a unique session identification number. A contact identification number is a unique identifier associated with a certain contact in an address book. A session identification number is a unique identifier associated with a calling period. The unique session identification number may remain valid for the length of an entire calling period, which, in an embodiment, may be the period of time from when the application is powered up and connected until the time that the application is powered down. A contact identification number may be assigned to each contact, and may remain valid for the duration of a calling period. In an embodiment, the unique session identification number and the contact identification numbers may expire after the calling period has closed, thus rendering them invalid for subsequent calling sessions. As such when a subscriber attempts to call a contact with stale status information, the application may attempt to dial in with an expired session identification number and/or reference an expired contact identification number, which may result in call failure. While a delay may exist while the server refreshes and updates a subscriber's contact information, a service provider may want to give a subscriber a feeling of being logged onto the network as soon as the subscriber's mobile device is powered on.

For example, in an embodiment, if a subscriber selects a contact from the cached address book having expired status information, the contact's phone number may not be immediately dialed. Instead, the subscriber's mobile device may dial a server and may dispatch the name of the desired callee across a network. The server may send back a session identification number to be utilized during the calling period and/or a contact information number that references the callee. In an embodiment, the server may also send a local access number to be used to contact the callee. Alternatively, the call may be completed without the use of a local access number.

In an embodiment, if a subscriber selects a contact from the cached contact list having stale status information, a prepare call may be sent to the server. The prepare call may include a session identification number, a callee's contact identification number, a callee's contact name and the like. The server may send back a new session identification number for the subscriber, a contact information number that references the callee, a local access number to be used to contact the callee and/or the like.

In an embodiment, if a subscriber selects a contact from the cached contact list having stale status information, a direct inward dialing (DID) number of the callee may be directly dialed, and the dual-tone multi-frequency (DTMF) tones of the caller may be appended to a dial-string associated with the call. A DID number is a feature offered by telephone companies for use with customer's private branch exchange. A telephone company may allocate a range of numbers all connected to the customers' PBX. As the PBX receives calls, the number that the caller dialed may also be presented so the PBX can route the call to the target callee. For example, DID numbers may be obtained by administrators of a VoIP network and assigned to a gateway in the network. The gateway may route incoming calls from the network to appropriate VoIP subscribers.

In an embodiment, a set of DIDs may be assigned to a gateway. The gateway may then reassign the DIDs to a particular mapping of caller-callee. For example, Caller A may have ten contacts, A-K. Each contact may be assigned a unique DID number. When Caller A selects a contact from his cached contact list, Caller A is, in effect, selecting the DID number associated with the contact.

In an embodiment, if a subscriber selects a contact from the cached contact list having expired status information, a callee's DID number may be directly dialed, and the DID number and the identification number of the caller may appear within the dial-string.

Figure 8:
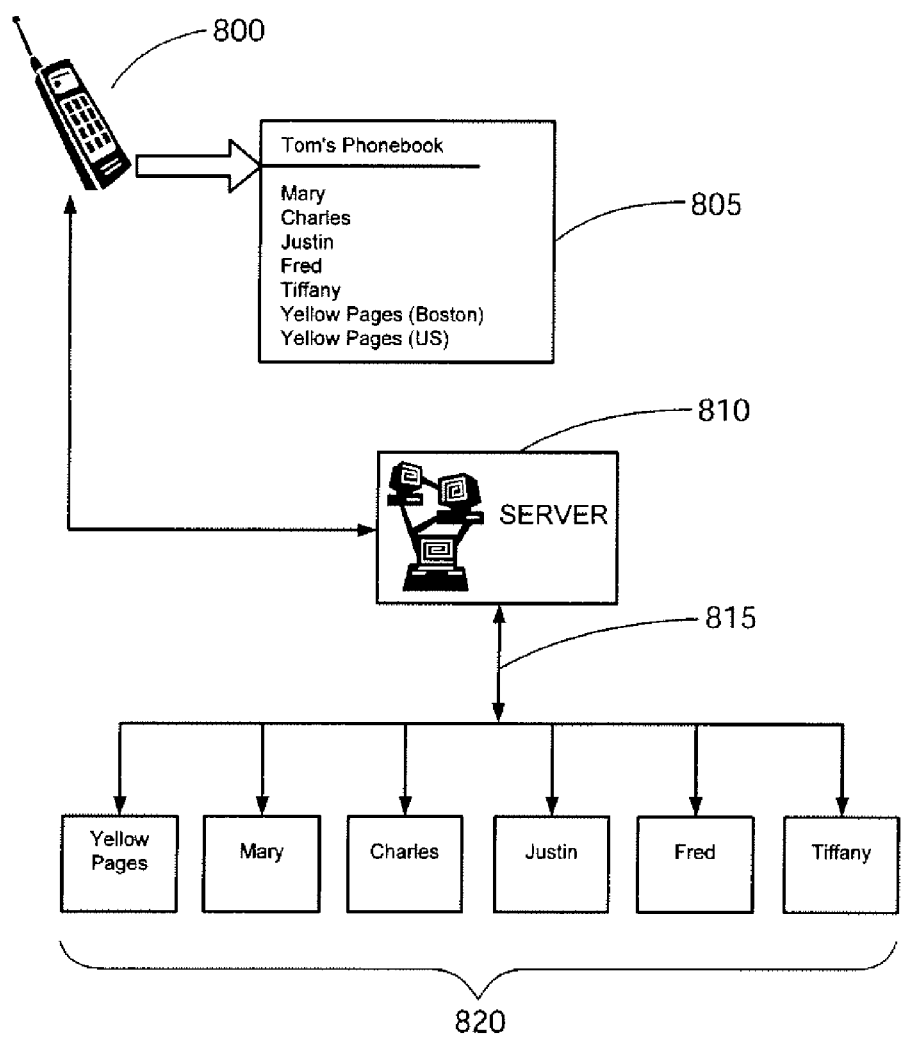
FIG. 8 illustrates an exemplary system for implementing mobile address book interaction according to an embodiment.

In an embodiment, a subscriber may use an address book on the subscriber's mobile device to call one or more contacts stored in the address book. The subscriber may communicate with these contacts by dialing the contact directly, by sending chat messages or the like. FIG. 8 illustrates an exemplary system for implementing mobile address book interaction according to an embodiment. In addition to being stored locally on a mobile device 800, the contact information in a subscriber's address book 805 may also be cached on a server 810 which may regularly update the address book information. The server may send information about the subscriber's contacts to the subscriber's mobile device 800 as it become available. In an embodiment, the subscriber's mobile device 800 may poll the server at specified intervals to receive updates about the subscriber's contacts. Updated information may be integrated into the subscriber's mobile address book 805 for the subscriber to access. In an embodiment, contact information may include a status message or the like.

As FIG. 8 illustrates, bi-directional communication 815 may exist between the server, the subscriber's mobile device and the contacts 820 who appear in the subscriber's address book. In an embodiment, the server may push information, such as a status message associated with the subscriber, to the contacts 820. The server may also pull information from the contacts 820 for transmission to the subscriber's mobile device.

For example, if the subscriber wishes to change his status message, the subscriber may set a new status message using his mobile device. The new status message may then be sent to the server to be propagated to the subscriber's contacts. When the server receives and processes the new status message, the server may send the new status message to all of the subscriber's contacts.

Figure 9:
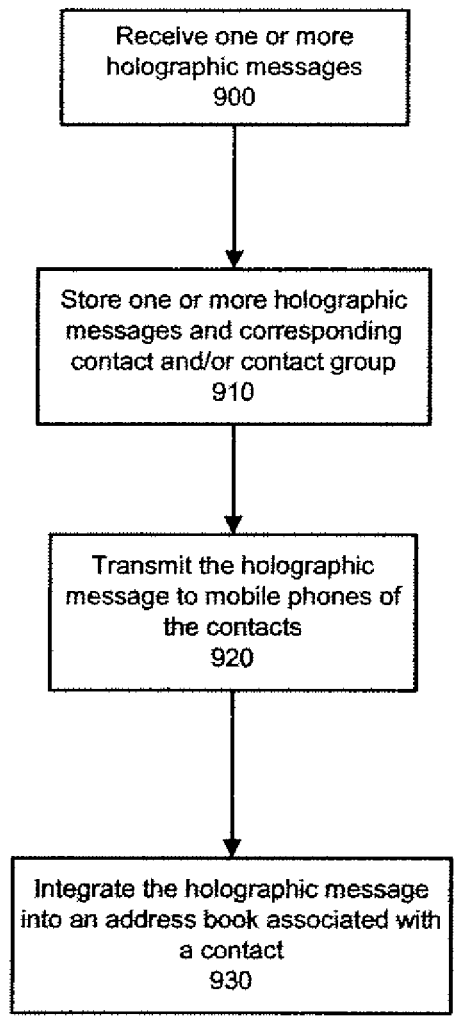
FIG. 9 illustrates an exemplary method of providing contact information according to an embodiment.

FIG. 9 illustrates a method of providing contact information according to an embodiment. A server may receive 900 one or more status messages, such as a holographic message, from a subscriber's mobile device. A holographic message relates to customized messages that differ based on which contact inquires about the subscriber's status. That is, different contacts may be presented with different messages depending on the identity of the contact. The present discussion is intended to comprehend a one-to-one correspondence between messages and contacts, but is not so limited, and also includes messages directed to subsets of more than one contact. For example, a subscriber's holographic message may read "I'm in a meeting" to work colleagues, but may read "I'm unavailable" to all other contacts.

In an embodiment, a subscriber may set a holographic message using the subscriber's mobile phone. The subscriber may identify a message for a specific contact. For example, a subscriber may set a holographic message that reads "I'll be home at 6:30 pm" to his wife. The subscriber may also set a holographic message for a specific contact group. For example, a subscriber may set a holographic message that reads "At the beach" to his friends.

In an embodiment, the holographic messages set by a subscriber may be sent to the server to be transmitted to the contacts in the subscriber's contact book. The server may store 910 a holographic message and corresponding contact or contact group. The server may transmit 920 the holographic message to the mobile phones of the appropriate contacts based on the contact's name, the contact's group or the like. In an embodiment, the server may integrate 930 the holographic message into an address book associated with a contact. The server may transmit one or more instructions to a contact's mobile device instructing the mobile device to display the holographic message.

In an embodiment, a list of most-recently called contacts may be kept. For example, the list may reflect the last ten contacts a subscriber called, chatted with, changed a status message for, or the like. Typically, a subscriber's address book is stored on a server, and a push presence technique is utilized to access contact information, such as a status message or the like. In an embodiment, the push presence technique requires a subscriber to retrieve the latest contact information from the server. However, a subscriber who as many contacts must access the server numerous times in order to view contact information which may drain the battery of the subscriber's mobile device. As such, a list of most-recently called contacts may be kept. This list may be stored on a subscriber's mobile device or on the server. If the list is stored on the server, the server must only push the contact information associated with the contacts in the most-recently called list instead of the contact information for every contact in the subscriber's address book.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of providing a status message, the method comprising;
    receiving, from a first mobile device, a set of one or more status messages, wherein each status message in the set is associated with a subset of contacts in a first address book of a subscriber associated with the first mobile device;
    determining a first status message from the set that is associated with a first contact from the first address book;
    responsive to the determination, transmitting the first status message to a second mobile device for presentation to the first contact;
    maintaining a list of a subset of contacts from the first address book for which the first mobile device most recently changed an associated status message; and
    transmitting contact information of the subset of contacts to the first mobile device instead of transmitting contact information for each contact in the first address book to the first mobile device.

2. The method of claim 1, wherein the first contact belongs to a first subset of contacts in the first address book corresponding to a contact group, and wherein the transmitting transmits the first status message to each mobile device associated with the first subset of contacts.

3. The method of claim 1, wherein the first status message is configured to be integrated into a second address book of the first contact on the second mobile device.

4. A method of providing contact information on a mobile device, the method comprising:
    generating a list of a subset of most recently called contacts made by a subscriber's mobile device from a server-based mobile address book;
    determining contact information for each most recently called contact, the contact information including one or more of a contact name, a telephone number, a mood message, a holographic message, or a status message; and
    transmitting, to the subscriber's mobile device, the list, the associated contact information, and one or more instructions configured to instruct the subscriber's mobile device to display the list and the associated contact information.

5. The method of claim 4, wherein the transmitting transmits the list of the subset of most recently called contacts instead of transmitting an entirety of contacts within the server-based mobile address book to the subscriber's mobile device to facilitate a quicker download of the list of the subset of most recently called contacts to the subscriber's mobile device.

6. A method of providing a status message, the method comprising;
    generating, at a mobile device, a set of one or more status messages, wherein each status message in the set is associated with a subset of contacts in an address book of a subscriber associated with the mobile device;
    transmitting the set of one or more status messages to a server for selective transmission of status messages by the server to respective subsets of contacts in the address book;
    changing a given status message associated with at least one contact in the address book, wherein the server maintains a list of a subset of contacts from the address book for which the subscriber most recently changed an associated status message; and
    receiving contact information of the subset of contacts from the server instead of receiving contact information for each contact in the address book from the server.

7. A server configured to selectively provide status messages, comprising;
    means for receiving, from a first mobile device, a set of one or more status messages, wherein each status message in the set is associated with a subset of contacts in an address book of a subscriber associated with the first mobile device;
    means for determining a first status message from the set of one or more status messages that is associated with a first contact from the address book;
    means for, responsive to the determination, transmitting the first status message to a second mobile device for presentation to the first contact;
    means for maintaining a list of a subset of contacts from the address book for which the first mobile device most recently changed an associated status message; and
    means for transmitting contact information of the subset of contacts to the first mobile device instead of transmitting contact information for each contact in the address book to the first mobile device.

8. A server configured to provide contact information, comprising:
    means for generating a list of a subset of most recently called contacts made by a subscriber's mobile device from a server-based mobile address book;
    means for determining contact information for each most recently called contact, the contact information including one or more of a contact name, a telephone number, a mood message, a holographic message, or a status message; and means for transmitting, to the subscriber's mobile device, the list, the associated contact information, and one or more instructions configured to instruct the subscriber's mobile device to display the list and the associated contact information.

9. A mobile device configured to provide status messages, comprising:

means for generating a set of one or more status messages, wherein each status message in the set is associated with a subset of contacts in an address book of a subscriber associated with the mobile device;

means for transmitting the set of one or more status messages to a server for selective transmission of respective status messages by the server to respective subsets of contacts in the address book of the subscriber;

means for changing a given status message associated with at least one contact in the address book, wherein the server maintains a list of a subset of contacts from the address book for which the subscriber most recently changed an associated status message; and means for receiving contact information of the subset of contacts from the server instead of receiving contact information for each contact in the address book from the server.

10. A non-transitory computer-readable storage medium containing instructions stored thereon, which, when executed by a server configured to selectively provide status messages, cause the server to perform operations, the instructions comprising:

program code to receive, from a first mobile device, a set of one or more status messages, wherein each status message in the set is associated with a subset of contacts in an address book of a subscriber associated with the first mobile device;

program code to determine a first status message from the set of one or more status messages that is associated with a first contact from the address book;

program code to, responsive to the determination, transmit the first status message to a second mobile device for presentation to the first contact;

program code to maintain a list of a subset of contacts from the address book for which the first mobile device most recently changed an associated status message; and program code to transmit contact information of the subset of contacts to the first mobile device instead of transmitting contact information for each contact in the address book to the first mobile device.

11. A non-transitory computer-readable storage medium containing instructions stored thereon, which, when executed by a server configured to provide contact information, cause the server to perform operations, the instructions comprising:

program code to generate a list of a subset of most recently called contacts made by a subscriber's mobile device from a server-based mobile address book;

program code to determine contact information for each most recently called contact, the contact information including one or more of a contact name, a telephone number, a mood message, a holographic message, or a status message; and program code to transmit, to the subscriber's mobile device, the list, the associated contact information, and one or more instructions configured to instruct the subscriber's mobile device to display the list and the associated contact information.

12. A non-transitory computer-readable storage medium containing instructions stored thereon, which, when executed by a mobile device configured to provide status messages, cause the mobile device to perform operations, the instructions comprising:

program code to generate a set of one or more status messages, wherein each status message in the set is associated with a subset of contacts in an address book of a subscriber associated with the mobile device;

program code to transmit the set of one or more status messages to a server for selective transmission of respective status messages by the server to respective subsets of contacts in the address book of the subscriber;

program code to change a given status message associated with at least one contact in the address book, wherein the server maintains a list of a subset of contacts from the address book for which the subscriber most recently changed an associated status message; and program code to receive contact information of the subset of contacts from the server instead of receiving contact information for each contact in the address book from the server.

13. A server configured to selectively provide status messages, comprising:

a memory; and a processor configured to:

receive, from a first mobile device, a set of one or more status messages, wherein each status message in the set is associated with a subset of contacts in an address book of a subscriber associated with the first mobile device;

determine a first status message from the set of one or more status messages that is associated with a first contact from the address book;

responsive to the determination, transmitting the first status message to a second mobile device for presentation to the first contact;

maintain a list of a subset of contacts from the address book for which the first mobile device most recently changed an associated status message; and transmit contact information of the subset of contacts to the first mobile device instead of transmitting contact information for each contact in the address book to the first mobile device.

14. A server configured to provide contact information, comprising:

a memory; and a processor configured to:

generate a list of a subset of most recently called contacts made by a subscriber's mobile device from a server-based mobile address book;

determine contact information for each most recently called contact, the contact information including one or more of a contact name, a telephone number, a mood message, a holographic message, or a status message; and transmit, to the subscriber's mobile device, the list, the associated contact information, and one or more instructions configured to instruct the subscriber's mobile device to display the list and the associated contact information.

15. A mobile device configured to provide status messages, comprising:

a memory; and a processor configured to:

generate a set of one or more status messages, wherein each status message in the set is associated with a subset of contacts in an address book of a subscriber associated with the mobile device;

transmit the set of one or more status messages to a server for selective transmission of respective status messages by the server to respective subsets of contacts in the address book of the subscriber;

change a given status message associated with at least one contact in the address book, wherein the server maintains a list of a subset of contacts from the address book for which the subscriber most recently changed an associated status message; and receive contact information of the subset of contacts from the server instead of receiving contact information for each contact in the address book from the server.

* * * * *